United States Patent
Suzuki et al.

(10) Patent No.: US 10,848,454 B2
(45) Date of Patent: Nov. 24, 2020

(54) SYSTEM AND METHOD FOR FACILITATING DRIVER COMMUNICATION VIA AN AUDIO CENTRIC NETWORK

(71) Applicant: Palo Alto Research Center Incorporated, Palo Alto, CA (US)

(72) Inventors: Masafumi Suzuki, Mountain View, CA (US); Oliver Brdiczka, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 494 days.

(21) Appl. No.: 14/582,005

(22) Filed: Dec. 23, 2014

(65) Prior Publication Data

US 2016/0182436 A1   Jun. 23, 2016

(51) Int. Cl.
| | |
|---|---|
| G06F 15/16 | (2006.01) |
| H04L 12/58 | (2006.01) |
| H04W 4/21 | (2018.01) |
| H04W 4/02 | (2018.01) |
| H04W 4/48 | (2018.01) |

(52) U.S. Cl.
CPC ............ *H04L 51/32* (2013.01); *H04L 51/20* (2013.01); *H04W 4/027* (2013.01); *H04W 4/21* (2018.02); *H04W 4/48* (2018.02)

(58) Field of Classification Search
CPC .................................................... H04L 51/32
USPC ........................................................ 709/206
See application file for complete search history.

(56) References Cited

U.S. PATENT DOCUMENTS

| | | | |
|---|---|---|---|
| 9,584,950 B2 * | 2/2017 | Tickoo | H04W 4/60 |
| 9,900,354 B1 * | 2/2018 | Thome | H04L 65/1093 |
| 2006/0161341 A1 * | 7/2006 | Haegebarth | G08G 1/20 701/117 |
| 2007/0162550 A1 * | 7/2007 | Rosenberg | H04L 51/04 709/206 |
| 2008/0090522 A1 * | 4/2008 | Oyama | H04W 48/12 455/41.2 |
| 2011/0238752 A1 * | 9/2011 | Weiss | G01C 21/26 709/204 |
| 2011/0246068 A1 * | 10/2011 | Luo | G01C 21/3407 701/472 |
| 2011/0300840 A1 * | 12/2011 | Basir | G10L 15/26 455/416 |
| 2012/0008526 A1 * | 1/2012 | Borghei | H04W 4/022 370/254 |
| 2013/0086164 A1 * | 4/2013 | Wheeler | C08L 97/02 709/204 |
| 2014/0005941 A1 * | 1/2014 | Paek | G01C 21/3415 701/533 |
| 2014/0074387 A1 * | 3/2014 | Lee | G08G 1/22 701/117 |

(Continued)

*Primary Examiner* — Kevin T Bates
*Assistant Examiner* — Clarence D McCray
(74) *Attorney, Agent, or Firm* — Krista A. Wittman

(57) ABSTRACT

A computer-implemented system and method for facilitating communication via an audio centric network are provided. A plurality of drivers are monitored, and a location of at least one of the drivers is determined. A social bubble comprising a network of other drivers proximate to the driver is determined based on the identified location. A command is received from the driver, and the command is transmitted to one or more of the drivers in the social bubble.

22 Claims, 10 Drawing Sheets

(56) References Cited

U.S. PATENT DOCUMENTS

2014/0214933 A1* 7/2014 Liu ..................... H04L 67/12
 709/204
2016/0323233 A1* 11/2016 Song ................... G08G 1/0141

* cited by examiner

SYSTEM AND METHOD FOR FACILITATING DRIVER COMMUNICATION VIA AN AUDIO CENTRIC NETWORK

FIELD

This application relates in general to social networks and, in particular, to a computer-implemented system and method for facilitating communication via an audio centric network.

BACKGROUND

Drivers currently have limited options to communicate with other drivers. For example, drivers can communicate through hand motions, a car horn, vehicle lights, or facial expressions. If a vehicle's headlights are not turned on at night, another driver may flash his headlights to indicate that the headlights are not on. Alternatively, when a driver allows another vehicle to merge into his lane, the driver of the other vehicle may wave his hand to indicate thanks. Further, drivers can communicate using, for instance, a cell phone and a hands free set. However, a driver can only communicate with another driver if the driver knows the identity of the other driver, as well as the cell phone number. Although limited, communication among drivers can improve the driving experience and reduce a number of vehicle accidents.

Attempts to encourage driver communication have been made. For example, Waze, by Google Inc., Mountain View, Calif., attempts to increase communication between drivers by allowing the drivers to contribute topic and road data, accident reports, police drops, and other hazards in real time. The data provided by the drivers is mapped for viewing by other drivers. The location of the drivers are also mapped. Thus, Waze focuses on a general sharing of information and fails to address controlled communication between drivers or allowing one driver to select another driver for communication.

Therefore, there is a need for an approach to facilitate communication between drivers, including dynamic community formation, vehicle identification, and controlled communication. Preferably, the communication is audio centric.

SUMMARY

A driver can initiate communication with one or more other drivers in close proximity based on a network of drivers, known as a social bubble. Drivers in the social bubble can be determined based on a proximity of the drivers to the initiating driver's vehicle. Next, the initiating driver can identify a specific driver in the social bubble based on characteristics of the specific driver or the specific driver's vehicle. The initiating driver can then verbally communicate a command intended for the specific driver. The command can be directly provided to the specific driver or analyzed prior to delivery. During analysis, a sentiment of the command is determined and validation can occur. When the command is determined to be positive and is successfully validated, the command can be delivered. Otherwise, if the command is not positive or cannot be validated, the command can be rewritten or deleted.

An embodiment provides a computer-implemented system and method for facilitating communication via an audio centric network. A plurality of drivers are monitored, and a location of at least one of the drivers is determined. A social bubble comprising a network of other drivers proximate to the driver is determined based on the identified location. A command is received from the driver, and the command is transmitted to one or more of the drivers in the social bubble.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

While driving, communicating with other drivers can be a challenge since limited communication means are available, including hand motions and vehicle signals, such as car lights or horns. Increased communication between drivers can help increase a driving experience and reduce a number of vehicle accidents by providing useful driving information and reminders to the drivers, such as turning on vehicle headlights and using turn signals. An audio centric social network for drivers can provide communication with proximate drivers that is controlled to avoid unnecessary disturbance to the drivers and prevent road rage.

Figure 1:
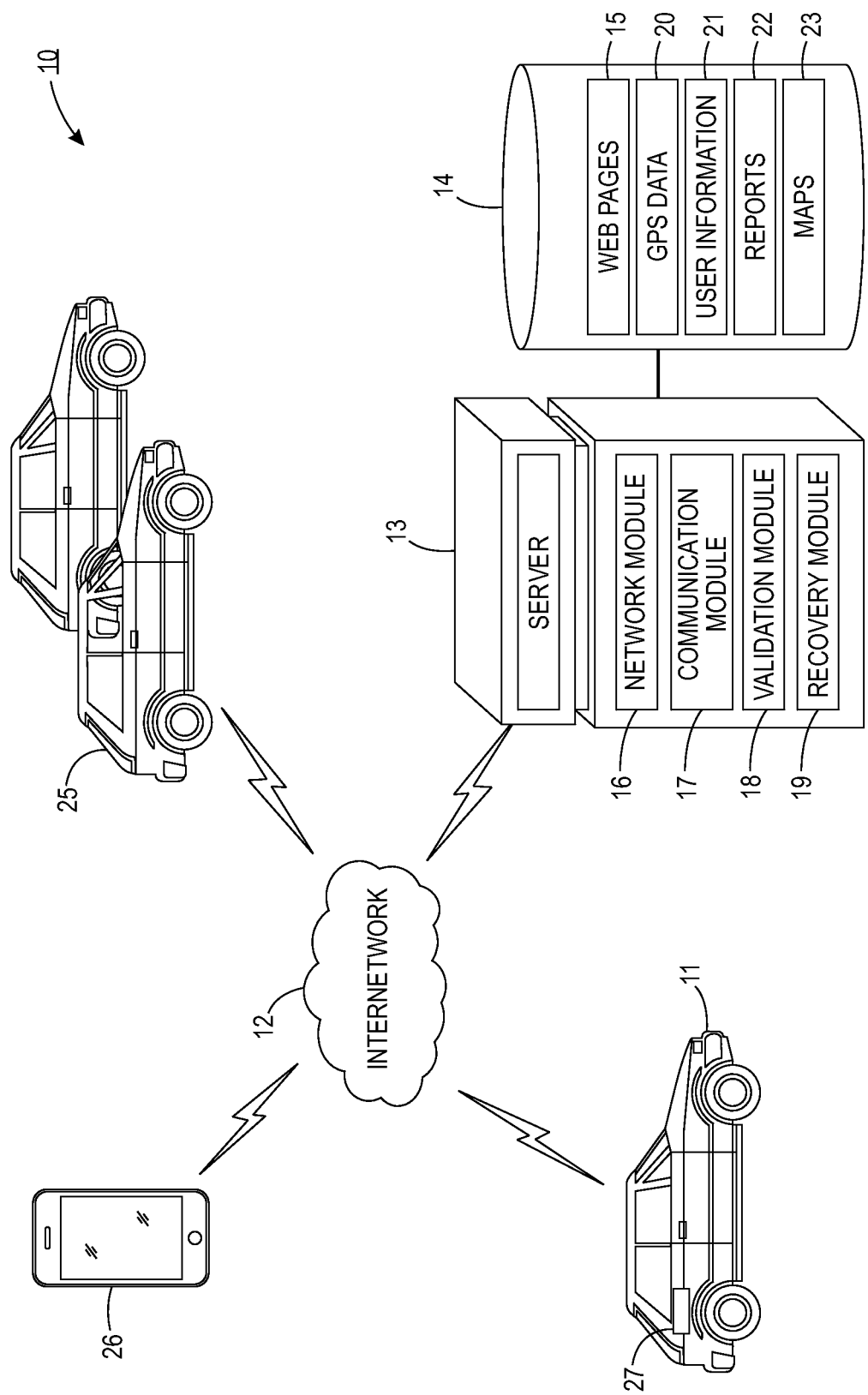
FIG. 1 is a block diagram showing a computer-implemented system for facilitating communication via an audio centric network, in accordance with one embodiment.

The audio centric social network described above allows drivers to communicate with one another in an efficient and safe environment. FIG. 1 is a block diagram showing a computer-implemented system for facilitating driver communication via an audio centric network, in accordance with one embodiment. A user driving a vehicle 11 can access a software application (not shown) or Webpage 15 for an audio centric social network via a cellular telephone 26 or other mobile handheld computing device (not shown). To access the Webpage 15, the user's cellular telephone 26 sends a request for the Webpage to a server 13 via an internetwork 12, such as the Internet. The Webpage 15 can be stored in a database 14 interconnected to the server 13 and transmitted to the user's cellular telephone 26 upon request.

Once accessed, the user can login to the application or Webpage to communicate with other drivers. To determine a network of the other drivers, racking of the user's vehicle 11 is initiated. The vehicle 11 can include a GPS navigation system 27 to obtain location coordinates 20 for the vehicle, which are transmitted to the server 13 and stored in the database 14. The coordinates can be obtained on a continuous basis, at predetermined times, or as requested. The server 13 includes a network module 13, communication module 17, validation module 18, and delivery module 19. A network module 16 utilizes the location coordinates 20 of the user's vehicle to identify proximately located vehicles 25 and generate a social bubble for the user based on the proximately located vehicles 25. The social bubble is constantly updated as the user's vehicle location changes. The user is able to broadcast to the entire social bubble or to identify a specific driver within the social bubble. The specific driver can be identified by the user using vehicle characteristics, driver characteristics, and occupancy. The vehicle and driver characteristics and occupancy can be provided by each driver and stored in a user profile 21. The characteristics can be identified by the user using natural language or predefined input commands. Alternatively or in addition, the vehicle and driver characteristics and occupancy can be obtained from sensors (not shown) within the vehicle to determine, for example, how many occupants are currently present in the vehicle. Upon identification of one or more drivers, the user can provide a command of verbal utterances intended for those drivers. The communication module 17 controls the verbal communication between the user and one or more of the drivers by utilizing the predefined input commands and determining whether the command from the user is appropriate for delivering to the drivers.

Communication from the user can occur via a microphone located in the user's vehicle 11 or a handheld mobile device 26. The validation module 18 validates the communication prior to delivery to ensure that the communication is useful and constructive. The delivery module 19 determines an appropriate time for delivering the communication to the intended drivers. An appropriate time can be a time that is least burdensome for the intended drivers. Finally, a report of the communications can be generated and provided to each driver based on communications sent and received by that driver. Specifically, the report can include a summary of the user's driving experiences and can be provided on a daily, weekly, monthly, or quarterly basis, as well as at different time periods, including after each driving session.

The mobile computing devices and server can each include a central processing unit and one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the computing devices and server can act as a specialized computer. For instance, when the modules are implemented as hardware, that particular hardware is specialized to perform message prioritization and other computers cannot be used. Additionally, when the modules are burned into read-only memory components, the computing device or server storing the read-only memory becomes specialized to perform the message prioritization that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
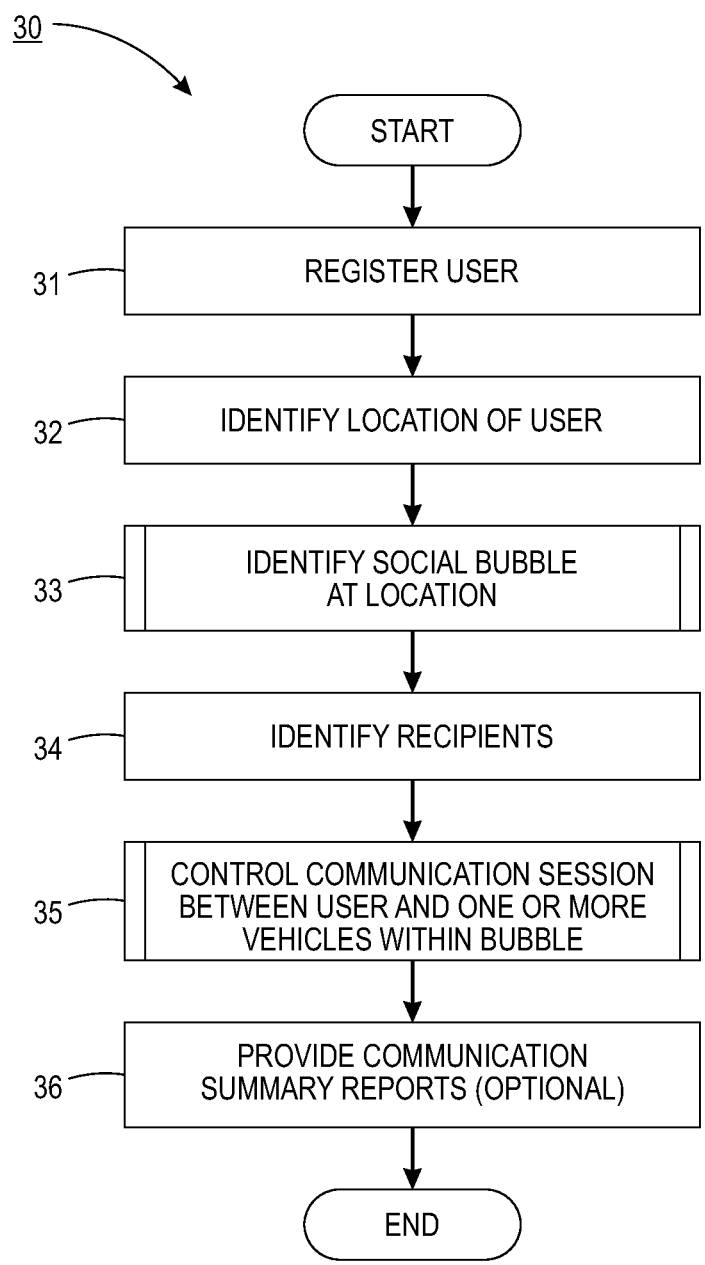
FIG. 2 is a flow diagram showing a computer-implemented method for facilitating communication via an audio centric network, in accordance with one embodiment.

Communication between drivers can be initiated via a social bubble. FIG. 2 is a flow diagram showing a computer-implemented method 30 for facilitating communication via an audio centric network, in accordance with one embodiment. A user first registers (block 31) with the social network, such as via a Webpage or a mobile computer application, by providing user identification information, which can be stored in a user profile. The user identification information can include name, address, telephone number, user interests, user characteristics, such as gender, hair color and age, vehicle characteristics, such as vehicle make and model, license plate number, vehicle color, vehicle shape or type, vehicle year and vehicle stickers, or driving information, such as frequent passengers. The user characteristics, vehicle characteristics, and driving information can be used by other drivers to identify the user for initiating communication.

Once the user begins driving, the location of the user is identified (block 32). The location can include coordinates that are obtained via a GPS system associated with a mobile device of the user or the vehicle on a continuous basis, as requested, or at predetermined times. Determination of the user's location coordinates can be triggered based on the user logging into and accessing the audio centric social network, a voice command, or a start of the vehicle's engine. Other triggers for determining the vehicle location are possible. The determined location can be used to identify (block 33) a social bubble, or community, for the user. The social bubble includes vehicles that are proximate to the user's vehicle. The proximate vehicles can be determined based on traffic density at the user's determination location and a speed of the vehicle, as further described below with reference to FIG. 3. Further, a number of vehicles in the social bubble can vary or a predetermined number of vehicles can be designated as a maximum number of vehicles for inclusion in the social bubble.

A general or specific communication session between the user and drivers of the other vehicles in the social bubble can be initiated (block 34). A general communication session includes all the members in the social bubble, including the user, while a specific communication includes the user and one or more drivers selected by the user from the social bubble. Initiating general and specific communication sessions is further described below in detail with respect to FIGS. 4 and 5. Communication during the sessions can be controlled (block 35). The communication can include commands of verbal utterances, which are received from the user and other participants in the session. In one embodiment, the commands can be predefined, and natural language utterances received from the user can be compared to the predefined commands to identify the appropriate predefined command for communication. Alternatively, the commands can include the natural language utterances. Each of the commands are reviewed for appropriateness and content, and can be validated, as further described below in detail with reference to FIGS. 6-8 to avoid unnecessary disturbance. Control over the command review, validation, and delivery helps provide easy-to-use and effective driver communication, while ensuring driver safety. The communication between the user and each other driver can be recorded and stored to optionally generate (block 36) summary reports of the comments, such as on a daily, weekly, or monthly basis. Other time periods are possible.

Figure 3:
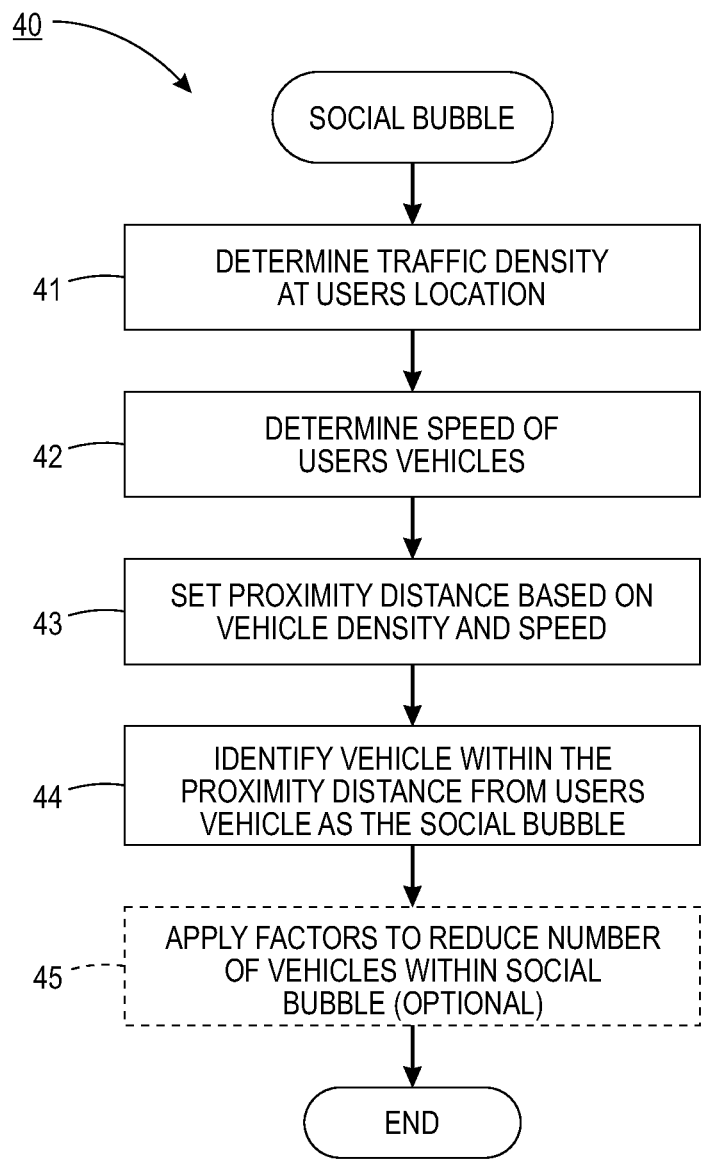
FIG. 3 is a flow diagram showing, by way of example, a process for determining a social bubble for a driver.

The social bubble includes a community of vehicles and associated drivers available for communication with the user. FIG. 3 is a flow diagram showing, by way of example, a process 40 for determining a social bubble. Members in the social bubble can be selected based on a proximity distance from the user. To determine the proximity distance, traffic density is determined (block 41). In high density traffic, a large number of vehicles are likely to be near the user. Therefore, high density traffic can be associated with shorter proximity distances to prevent an extremely high number of vehicles from being included as members in the social bubble. Alternatively, low density traffic can be associated with longer proximity distances to include a reasonable number of vehicles with which the user can communicate.

The proximity distance can also be determined based on a speed (block 42) of the user's vehicle. When the user is driving faster than the speed limit, a longer proximity distance is generally assigned as faster driving speeds can indicate empty roads on which the user can speed. In contrast, driving speeds below a designated speed limit can be associated with shorter proximity distances since slow speeds generally indicate traffic and a close proximity of many cars. Further, when the user is driving at high speeds, such as 60 mph and above, the proximity distance can be shorter since the user is likely on a highway and highways tend to have lots of vehicles.

Subsequently, a proximity distance is set (block 43) based on the traffic density and vehicle speed. The proximity distance can be based on predetermined distances associated with the determined traffic density and vehicle speed, as well as based on other methods for determining the proximity distance. For instance, when based on predetermined distances, traffic density that is 10% over the average can be associated with a proximity of 40 feet, while a speed that is 5% below the designated speed is associated with a distance of 35 feet. To determine the proximity distance, an average of the distances for the traffic density and vehicle speed can be averaged and provided as the proximity distance.

In a further embodiment, the proximity distance can be determined using a distance grid, which includes either the traffic density or vehicle speed along a horizontal axis and the other of the traffic density or vehicle speed along a vertical axis. The axes identify a measure of the traffic density and vehicle speed. Predetermined proximity values are then filled in for each combination of traffic density and vehicle speed. Once the grid is completed, values for the traffic density and vehicle speed determined for the user can be identified on the grid and the proximity distance for the values of density and speed can be determined.

The locations of other vehicles registered with the audio centric social network can be determined and those vehicles within the proximity distance of the user's vehicle are selected (block 44) for inclusion in the social bubble for the user. In one embodiment, a size threshold can be applied to the social bubble and if the number of vehicles within the social bubble exceeds the threshold, the social bubble can be reduced by applying rules (block 45) to identify vehicles for removal. The rules can include removing all vehicles driving in an opposite direction or removing all vehicles further from the user than an additional proximity distance that is shorter than the proximity distance previously applied.

Alternatively, the social bubble can be determined by identifying all vehicles within a predetermined vehicle proximity distance of the user's location regardless of the traffic density and vehicle speed. In this embodiment, the higher the traffic density, the larger the social bubble, and the lower the traffic density, the smaller the social bubble. To reduce a size of the social bubble, a predetermined size threshold for a number of vehicles within the social bubble can be applied and when the number of vehicles within the social bubble exceeds the size threshold, one or more reduction rules can be applied. The rules can include removing all vehicles driving in an opposite direction or removing all vehicles further from the user than a second proximity distance. In contrast, to increase the size of a social bubble, a longer proximity distance can be applied.

As the user continues driving, vehicle members within the social bubble can change based on a proximity of the member vehicles to the user's vehicle. For instance, if the user is driving at 66 mph on a highway and another driver determined to be within the user's social bubble is only driving 59 mph, the driver will eventually be removed from the social bubble as the user increases his distance from the driver and the other driver is no longer within the proximity distance for the social bubble. However, if the user is conversing with the driver when the driver is no longer determined to be included in the social bubble, the communication connection can be maintained so that the user and driver can continue to communicate. The social bubble can be determined on a continuous basis, at predetermined time intervals, or at predetermined times.

In one example, Derrell is driving a black Acura southbound along Rainier Avenue in south Seattle during rush hour at 5:30 p.m. on Wednesday. Rainier Avenue, is an arterial street with a speed limit of 30 mph, and has two southbound lanes and two northbound lanes. However, due to the rush hour traffic, Derrell is driving at 22 mph. Upon registering or signing in to the audio centric social network, the location of Derrell's vehicle is determined as 47.576111, −122.292778. Based on the location, a network of vehicles in proximity to Derrell's vehicle are identified as belonging in a social bubble. Specifically, the traffic density is determined to be 10% higher than average and Derrell's speed is 8 miles lower than the posted limit of 30 mph. A distance of 30 feet is associated with the increased traffic density and a distance of 24 feet is associated with Derrell's speed, which is 23% slower than normal. Thus, the proximity distance is determined to be 27 feet. All vehicles within 27 feet from Derrell's vehicle are identified as being part of Derrell's social bubble. In this example, 16 vehicles are identified. A size threshold of 200 vehicles is applied and since the vehicles in the social bubble do not exceed the size threshold, no reduction factors need be applied.

Figure 4:
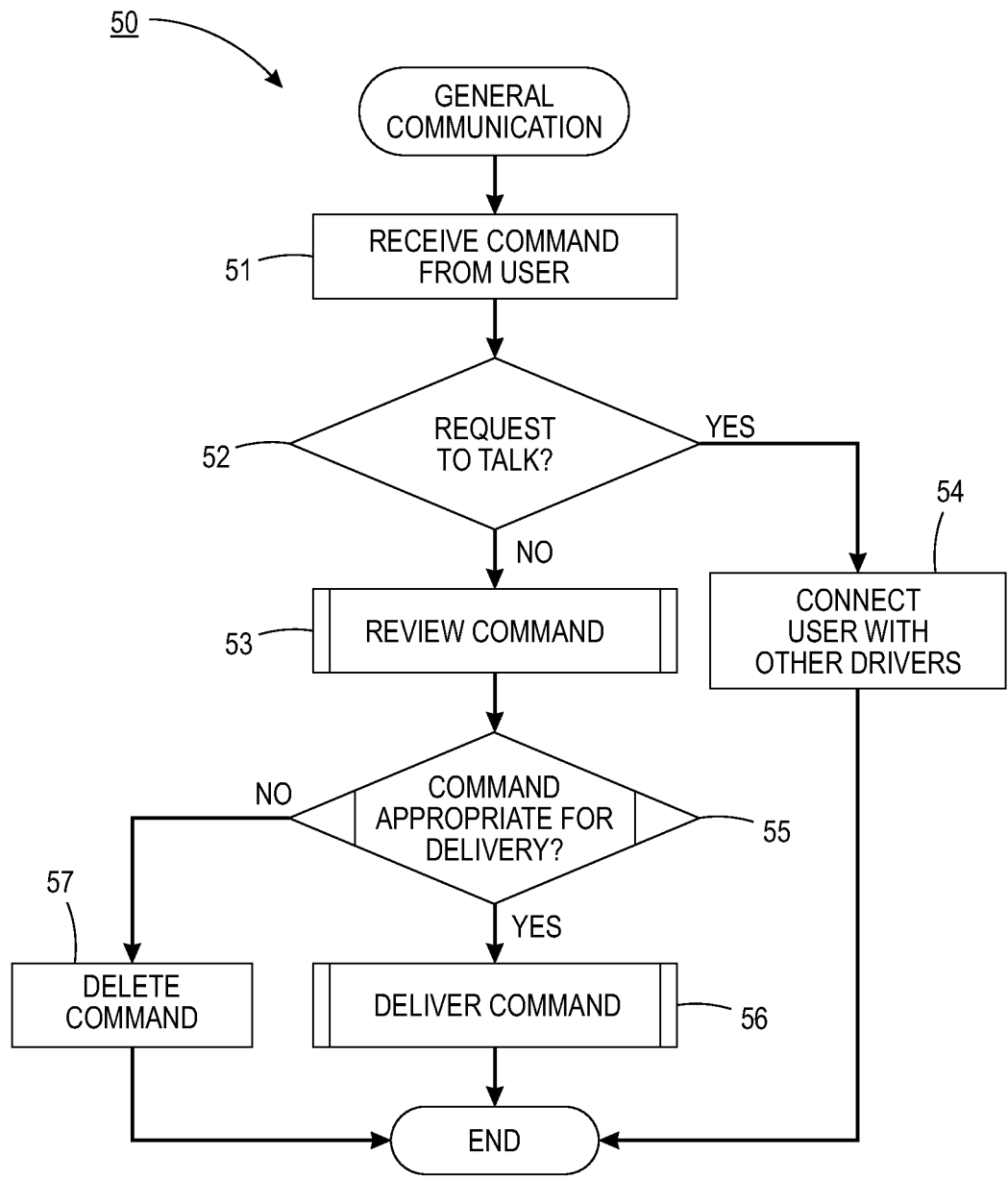
FIG. 4 is a flow diagram showing, by way of example, a process for facilitating general vehicle communication.

The user can initiate communication with one or more drivers associated with vehicles in the social bubble. General communication focuses on communication between a user and all of the other drivers associated with a social bubble for the user, while specific communication focuses on communication with one or more of the drivers associated with the social bubble as identified by the user. FIG. 4 is a flow diagram showing, by way of example, a process 50 for facilitating general vehicle communication. During the general communication, the user can speak directly with the drivers or can provide commands that are first reviewed and then played to the drivers. A verbal command of one or more natural language speech utterances is received (block 51) from the user. The command can include content, such as driving instructions, conditions or suggestions, social conversation, requests for driver communication, and directions, as well as other types of communication. In one embodiment, the natural language utterances provided by the user can be compared with a set of predefined commands to identify a most similar command for delivering to the intended recipient. Alternatively, the natural language provided by the user can be identified as the commands.

A determination (block 52) is made as to whether the command is a request to talk. If so, the user is directly connected (block 54) with the other drivers associated with the vehicles in the social bubble. Each member within the social bubble can be a sender or recipient of the commands. For example, each command verbalized by the drivers in the social bubble can be heard by or responded to by the other drivers in the bubble, similar to a conference call or a conference like forum. However, the user is also able to directly interact with one or more of the other drivers in a side conversation, similar to a chat room. If two or more of the drivers want to have a conversation separate from the whole group, a subconversation can be formed and the volume of speech from the two or more driver participants can be increased, while the volume of speech from the other drivers is reduced. The subconversations can be formed to prevent the side conversation from interfering with the main conversation of the social bubble. In a further embodiment, the user can be automatically connected with the other drivers in the social bubble upon creation of the bubble.

If the command from the user is not a request to talk, the command is reviewed (block 53) to ensure the content is appropriate for transmitting to another driver within the social bubble. Appropriate commands include positive information, such as helpful suggestions, traffic updates, and requests for contact information for further communications. An expert can review the command and assign a status of "positive" or "negative." Additionally, a mechanical turk can be used to classify comments as positive or negative or machine learning can be used for classification based on the content of each command.

Appropriate commands should also be validated based on the sender or recipient. Sender validation analyzes a reputation of the sender and can validate the message when the sender's reputation is positive, which is described in further detail below with reference to FIG. 7. Recipient validation analyzes a history of commands received by the recipient and whether a current command to be validated is consistent with the previously received commands, as described in further detail below with reference to FIG. 8.

If the command is appropriate (block 55) for delivery, the command can be delivered (block 56) to one or more of the drivers associated with the social bubble. Specifically, the command can be delivered verbally as a recording of the sender's voice or based on synthesized speech. A time for delivering the command can be determined based on a cognitive load of the user. For instance, the command can be delivered when the cognitive load of the user is low. When the cognitive load of the user is high, the command can be retained until the user's cognitive load is lowered. Delivering the command is further detailed below in detail with respect to FIG. 9. If the command is inappropriate (block 55) for delivery, the command may not be provided to the other drivers and can instead be deleted (block 57).

Returning to the above example, Derrell provides a verbal command of "request talk." Based on the command request, Derrell is connected with the drivers of the 16 vehicles in the social bubble and can speak directly with the drivers. While connected with the drivers, Derrell can hear commands from any of the drivers that address the social bubble. Further, every driver in the social bubble can hear commands directed to the community by Derrell. Eventually, Derrell finds himself in a one-on-one conversation with another driver, Justin. This one-on-one conversation can be identified automatically and the volume of communication between Derrell and Justin can be emphasized, while communication from other drivers in the social bubble can be decreased in volume. Alternatively, Derrell or Justin can request to participate in a subconversation.

Figure 5:
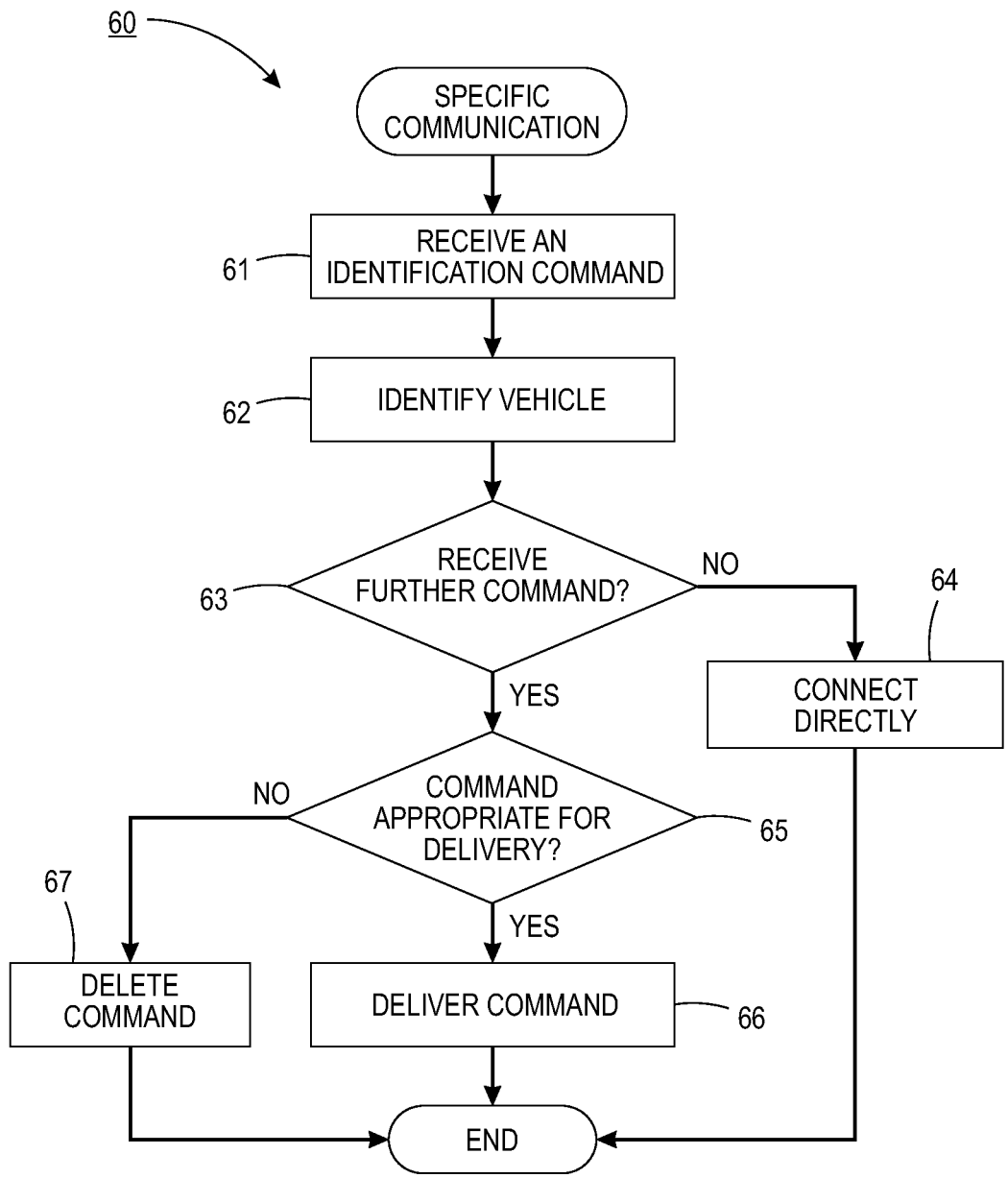
FIG. 5 is a flow diagram showing, by way of example, a process for facilitating specific vehicle communication.

In addition to or in lieu of general communication, the user can identify one or more drivers in the social bubble with whom to communicate. FIG. 5 is a flow diagram showing, by way of example, a process 60 for facilitating specific vehicle communication. The user provides (block 61) a command, such as via verbal speech. The command includes vehicle identifiers, such as a vehicle license plate number, vehicle shape or type, color, stickers, and make and model, or driver identifiers, such as gender, hair color, and age, as well as vehicle occupancy. Other identifiers are possible. In one embodiment, the command can include partial identification information, such as the first two or three symbols of the license plate number, rather than the entire license plate number. Examples of the identification commands can include "gold Camry," "SUV 82," or "convertible, two occupants."

When the identification information applies to more than one vehicle in the social bubble, a verbal request can be provided to the user to disambiguate possible vehicles by providing further distinguishing attributes of the vehicle or driver. Semantic parsing of the identification information can be performed and compared with the profiles of the drivers associated with vehicles in the social bubble to identify vehicles that match the parsed information. With regards to vehicle colors, each driver generally has a different color perception and to avoid excessive color segmentations, such as blue, light blue, cobalt blue or green blue, color grouping around strong colors can be adopted, such that related colors are grouped together. For example, all different variations of blue can be grouped as a single color for blue.

The social bubble for the user is analyzed to identify (block 62) a vehicle matching the user's description. The user can speak directly with a specific driver associated with the identified vehicle, or can provide commands that are first reviewed and then verbally provided to the specific driver. The type of communication can be determined based on whether a command is received (block 63) from the user after the driver or vehicle identification command. If no further command is received, the user can be directly connected (block 64) with the driver of the identified vehicle specified by the user. However, in one embodiment, a request for communication is first sent to the driver. Before the user is directly connected, the driver must accept the request. If the request is not accepted, the user may not be connected with the driver or can indirectly provide the comment as described below.

If a further command is received, the command can be analyzed to determine whether the command is appropriate (block 65) for delivery to the driver associated with the identified vehicle. If the command is appropriate, the command can be delivered (block 66). Alternatively, if the command is not appropriate, the command can be deleted (block 67).

Returning to the above example, while Derrell and Justin are talking, another driver, Domynic, speaks a command that is directed to Derrell, "[black acura] thanks for letting me in." Since Derrell and Justin are already participating in a conversation, a request for communication with Domynic is provided to Derrell. Derrell is not finished speaking with Justin and thus, refuses the request so Domynic is not directly connected to Derrell. The command from Domynic can alternately be reviewed, analyzed for appropriateness, and verbally delivered to Derrell when appropriate. The command can be provided to Derrell during or after his conversation with Justin.

Figure 6:
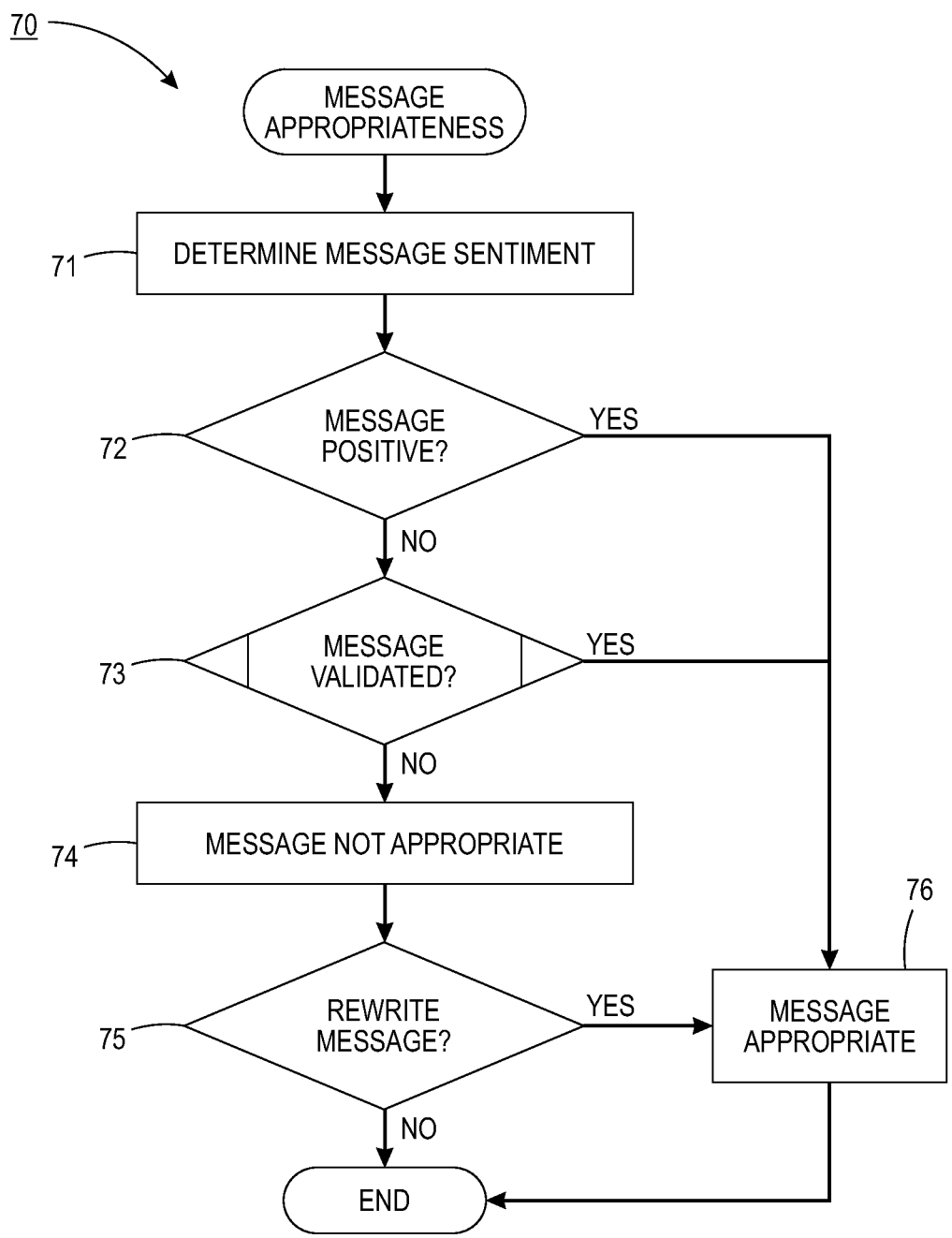
FIG. 6 is a flow diagram showing, by way of example, a process for determining the appropriateness of a command for delivery.

Controlled communication between the user and other drivers helps to prevent road rage and any negative feelings between the drivers. The communication can be controlled by analyzing commands from a sender, such as the user, to determine whether each command is appropriate for delivery. FIG. 6 is a flow diagram showing, by way of example a process 70 for determining the appropriateness of a command for delivery. The command is analyzed for content, and in particular a sentiment of the command is determined (block 71) based on the content. If the sentiment is positive (block 72), the command is determined to be appropriate (block 76) and is delivered to one or more drivers associated with vehicles in the user's social bubble. Positive commands can include helpful information to the drivers, suggestions, or reminders, as well as traffic updates and accident reports. Examples of positive commands include "[white truck] thanks [red convertible 6]" or "[white truck] identifies an accident on $5^{th}$ and Union, take detour [all vehicles]." The positive command can identify the sender of the message, the content of the message, and a recipient of the message. Meanwhile, negative, or offensive, commands include information that a recipient may find offensive or that can incite anger on behalf of the recipient or can create unfavorable impressions of the sender. The negative commands may include only identification of the recipient and content of the command, such as "[blue Honda] driving too slow" or "[jeep] is tailgating" to protect an identity of the sender.

The negative commands are reviewed for validation. A negative command can be validated by the sender of the command or an intended recipient of the command, as further described below in detail with reference to FIGS. 7 and 8. If the message is validated (block 73), the command is determined to be appropriate (block 76) and can be subsequently delivered to an intended driver associated with the social bubble. Alternatively, if the command is not validated, the command is determined to be inappropriate (block 74). Inappropriate commands can be rewritten (block 75) to reword the content in a positive light and to remove any insulting terms. The rewriting of the command can render the message appropriate (block 76) for delivery. For instance, the above-identified negative commands can be rewritten as "would you like to move to a slower lane?" or "wider car interval might improve your safety." However, if not rewritten, the command remains inappropriate and can be deleted.

With regards to the above example, the command provided by Domynic is determined to be appropriate because the sentiment of the command that gives thanks to Derrell is positive. However, a further driver, Jafar, provides a verbal command directed to Derrell as follows "[black acura] slow down, you're tailgating." The comment from Jafar can be interpreted as negative and is not validated. Thus, the command is inappropriate for delivering to Derrell "as is." Since tailgating commands are common, the command can be rewritten as "[black acura] please increase your safety by increasing the distance between you and another vehicle" and verbally provided to Derrell as a recorded message or as a voice generated message.

Figure 7:
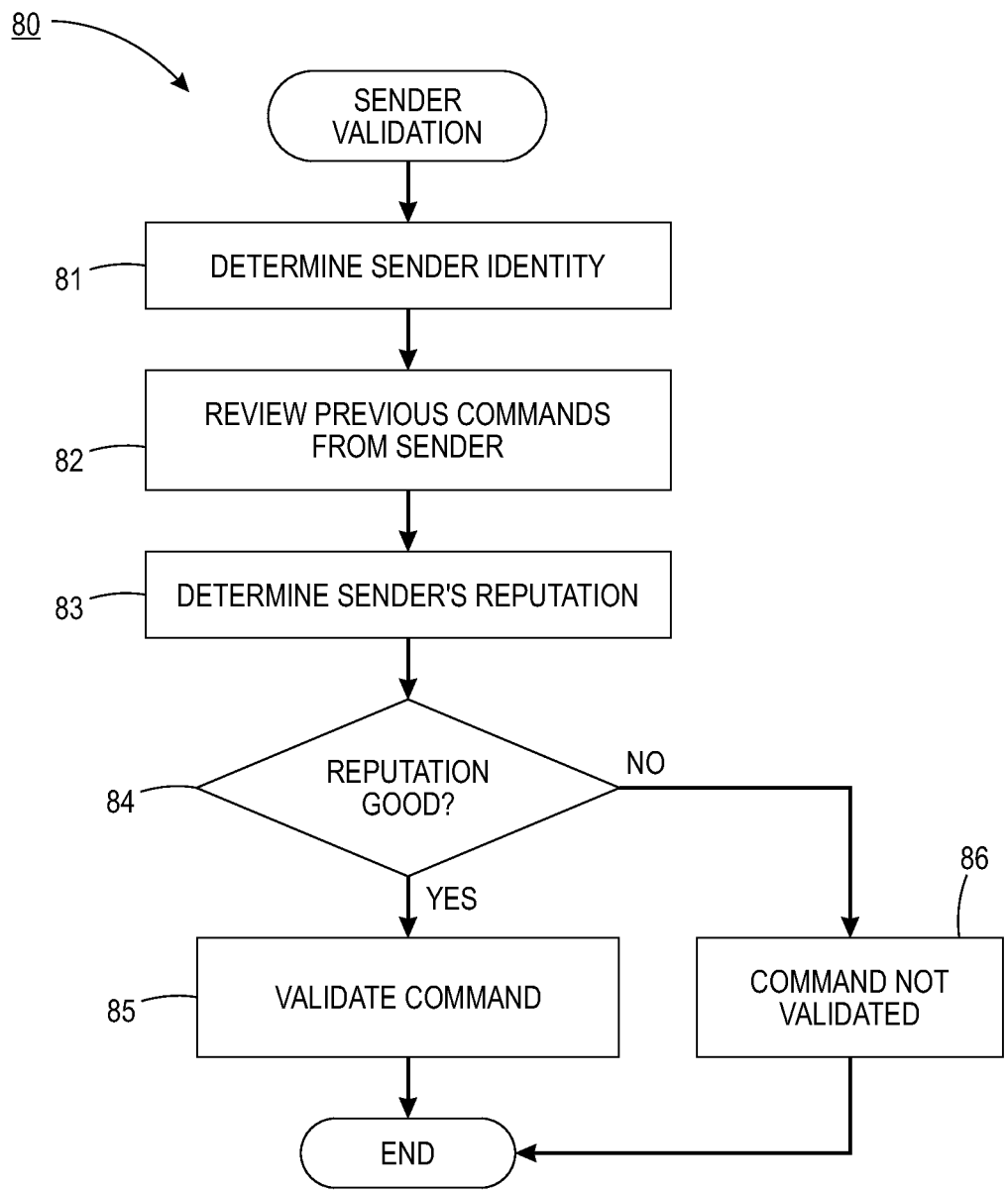
FIG. 7 is a flow diagram showing, by way of example, a process for sender validation of a command.

Although negative content is included, a command can still be appropriate for delivery when the command is validated. The command can be validated based on a reputation of the sender or a driving history of the recipient. FIG. 7 is a flow diagram showing, by way of example, a process 80 for sender validation of a command. An identity of a sender is determined (block 81). The sender can be the user or any other driver associated with the sender's social bubble. A command history for the sender is obtained and commands previously provided by the sender are reviewed (block 82) to determine (block 83) a reputation of the sender. The sender's reputation can be based on a number of previously provided commands that were determined to be appropriate and delivered to the intended recipient. For instance, a good or reliable reputation can be associated with a threshold number of appropriate commands. When the appropriate commands of the sender satisfy the threshold, the sender's reputations is determined to be positive. Otherwise, if the threshold is not satisfied, the sender's reputation can be determined as neutral or bad based on further thresholds.

Additionally, the sender's reputation can be based on whether the commands provided by the sender were helpful to other users. The helpfulness of a command can be determined by a rating system that receives votes from the recipient based on a level of helpfulness of the command. The more votes, the more likely the sender's reputation will be identified as good. If the user's reputation is determined to be good (block 84), the command can be validated (block 85) and delivered to the intended recipient. Otherwise, if the user's reputation is not good, the command is not validated (block 86) and not delivered.

Figure 8:
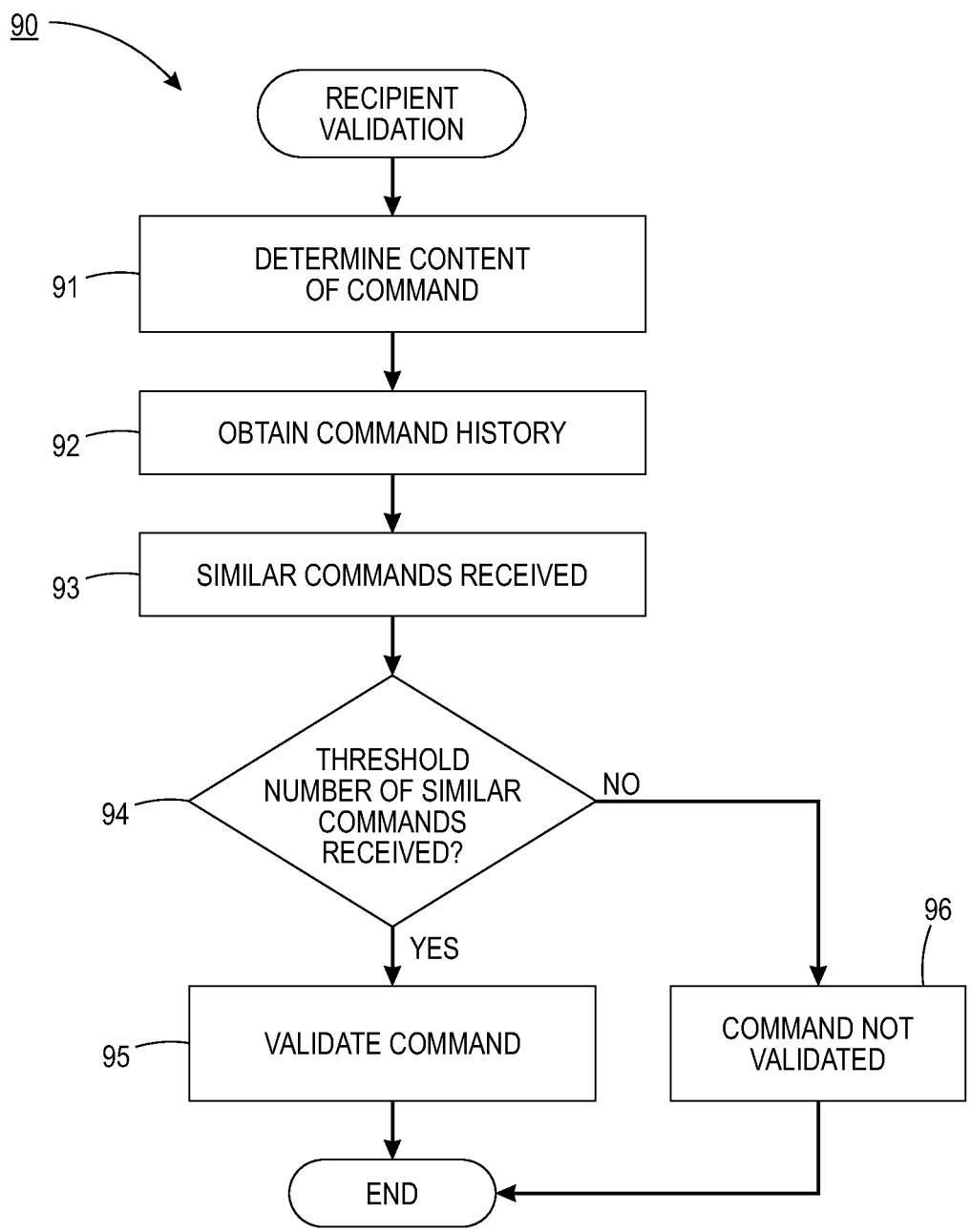
FIG. 8 is a flow diagram showing, by way of example, a process for recipient validation of a command.

In contrast to sender validation, recipient validation is based on a driving history of the command recipient. FIG. 8 is a flow diagram showing, by way of example, a process 90 for recipient validation of a command. The command is analyzed and content of the command is determined (block 91). The content can include a message that the sender is attempting to relay to the intended recipient. Subsequently, a command history of the recipient is obtained (block 92). The command history can include commands previously sent and received by the recipient, and can be accessed via a database. The content of the current command is compared with the command history to determine whether previous commands received by the recipient are similar to the content of the current command. If similar commands have been identified (block 93), a threshold number of similar commands can be optionally applied (block 94) to the similar commands. If a number of the similar commands satisfies the threshold, the command is validated (block 95). However, if the number of similar commands does not satisfy the threshold, the command is not validated (block 96) and may be deleted.

In a further embodiment, the command can be validated based on a combination of sender and recipient validation. For example, a score or other value can be separately assigned to the sender validation and the recipient validation. Subsequently, the scores can be totaled and averaged. If the average score satisfies a validation threshold, the command is validated. Otherwise, the command is not validated when the average score does not satisfy the threshold. For example, returning to the above scenario, the command from Jafar regarding tailgating can be analyzed and validated for delivery, rather than deleted. The validation determination for the command is based on sender and recipient validation. With regards to sender validation, the sender's comment history, and particularly, the sent commands are reviewed to determine whether Jafar sends useful and constructive messages. Based on Jafar's sent comment history, a value between 0 and 1 is assigned. Specifically, a value of 0.6 is assigned for sender validation since around 60% of Jafar's comments were determined to be useful and delivered. For instance, Jafar is sometimes an impatient driver that likes to drive fast and provides lots of comments regarding drivers going too slow; however, the comments are sometimes not delivered because they can be interpreted as negative and are not validated. In a further embodiment, a value can be directly assigned to a determination of Jafar's reputation for instance, when Jafar's reputation is determined to be good, a value of 1 can be assigned, and when Jafar's reputation is not good, a value of 0 can be assigned.

For recipient validation, Derrell's comment history is obtained and reviewed. Based on Derrell's comment history, Jafar's tailgating command is validated because in the past two weeks, Derrell has received three other comments regarding tailgating. A value of 0.08 is assigned since multiple similar commands were received in a short time period. The average of the two validation values is 0.7. A threshold of 0.65 is applied to the average value, which satisfies the threshold, resulting in validation of Jafar's command.

Figure 9:
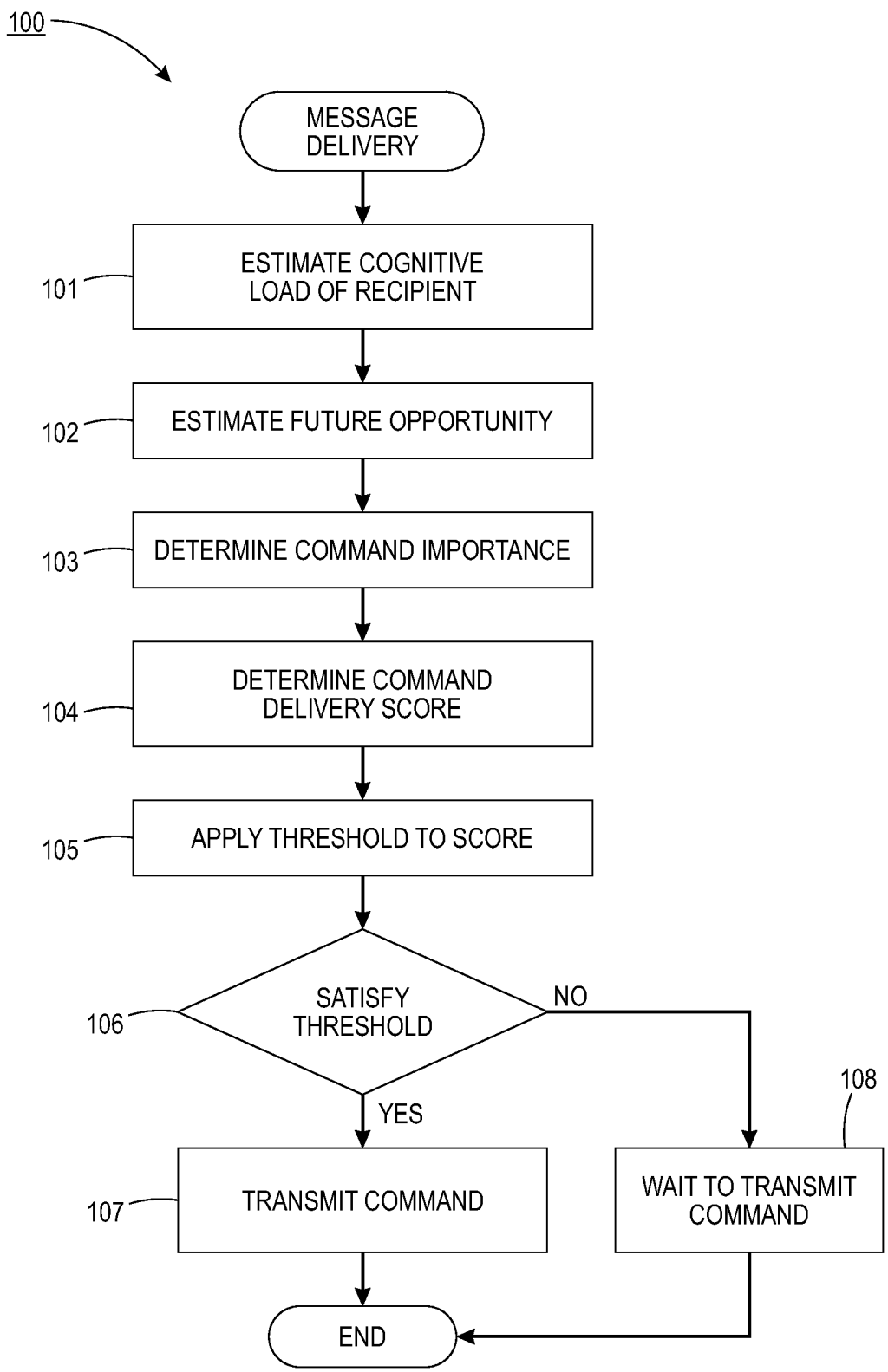
FIG. 9 is a flow diagram showing, by way of example a process for delivering a command based on a recipient's cognitive load.

Once a command has been determined to be appropriate, the command is delivered to the recipient. The command can be delivered upon the determination of appropriateness, at a predefined time, or based on the recipient's cognitive load. FIG. 9 is a flow diagram showing, by way of example a process 100 for delivering a command based on a recipient's cognitive load. Determining whether a message should be delivered based on cognitive load is further discussed in detail in commonly-owned U.S. patent application Ser. No. 14/581,975, titled "System and Method for Determining an Appropriate Time for Providing a Message to a Driver," filed on Dec. 23, 2014, the disclosure of which is hereby incorporated by reference. First, a cognitive load of the recipient is calculated (block 101) to determine whether the recipient is currently able to handle receipt of the command and the distraction caused by receipt of the command. The cognitive load of a recipient refers to a total amount of activity imposed on the recipient's working memory, and thus, the amount of mental processing required of the recipient. For instance, when the recipient's cognitive load is high, the recipient is less able to handle receipt of the command due to the high amount of mental processing required. Conversely, when the cognitive load of the recipient is low, the recipient may be better able to handle viewing the message since less processing is required by the recipient. The driver's cognitive load can be based on multiple factors, including road conditions, sensor readings and anomalies, surrounding a current driving condition of the recipient at a particular time and location.

Additionally, a determination regarding whether a better opportunity exists (block 102) in the future for presenting the command is made. Specifically, a route of the recipient is determined and used to determine a future location along the route that may be a better opportunity for presenting the command to the recipient than the current time. An importance of the command is also determined (block 103) to help identify whether the message should be immediately delivered to the recipient or whether the message delivery can wait for a better opportunity. The command importance can be based on an importance of the sender, whether the command includes a request or proposed action, and a length of time necessary to provide the command. Determining command importance is further described in detail in commonly-owned U.S. patent application Ser. No. 14/581,945, titled "Computer-Implemented System and Method for Prioritizing Electronic Messages Based on Importance," filed on Dec. 23, 2014, the disclosure of which is hereby incorporated by reference. Subsequently, a delivery determination score is calculated (block 104) based on values assigned to the cognitive load, future opportunity, and message importance factors. A threshold is applied (block 105) to the delivery determination score and if the score satisfies (block 106) the threshold, the command is delivered (block 107). Otherwise, if the score fails to satisfy (block 106) the threshold, the command is held (block 108) until a further time.

Figure 10:
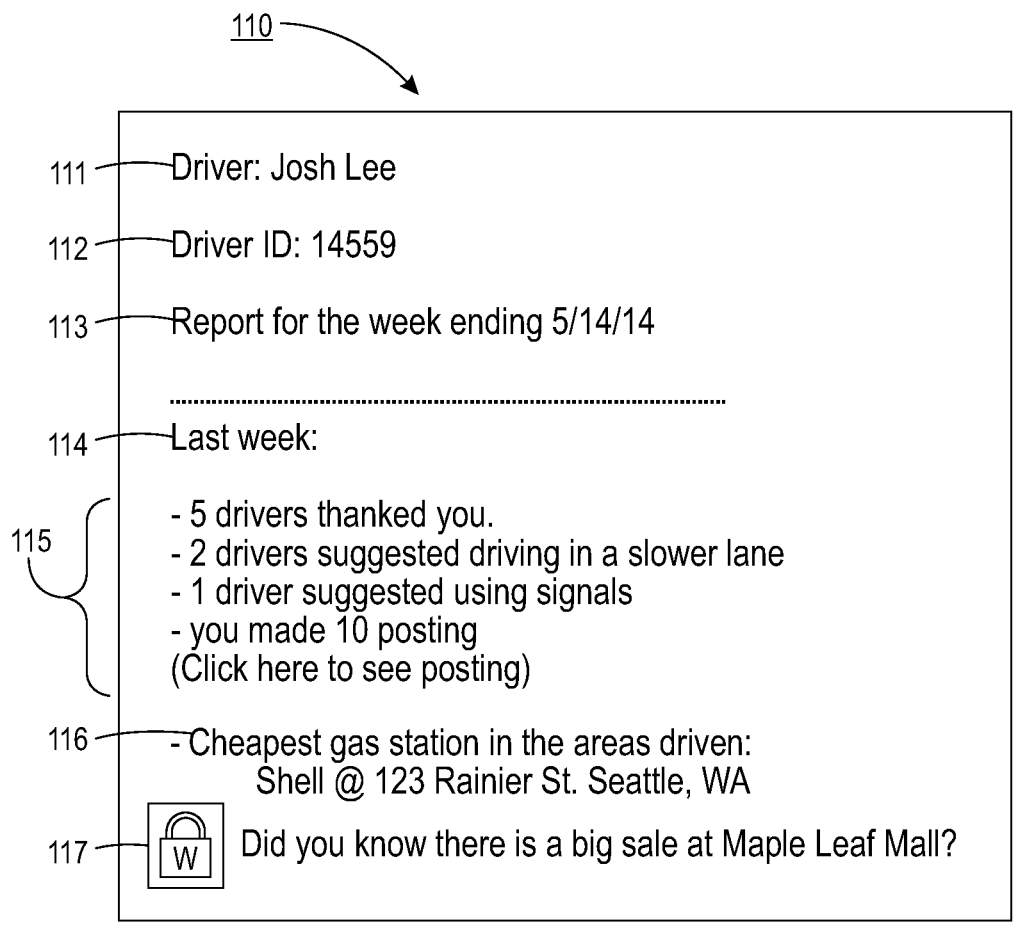
FIG. 10 is a block diagram showing, by way of example, a report with driver feedback.

All commands whether delivered, deleted, or received can be recorded in a command history for a driver. Based on the driver's command history, a report can be generated and provided to that driver. FIG. 10 is a block diagram showing, by way of example, a report 110 with driver feedback. Each driver registered with the audio centric social network can elect to receive a report summarizing comments sent by and received by that driver. In a further embodiment, appropriate, but undelivered commands can be included in the report.

The report can be delivered via a verbal message, email, or text, as well as via other delivery means, on a continuous or predetermined basis. For example, a driver can elect to receive a summary on a daily, weekly, monthly, or quarterly basis, as well as at other time periods. The report 110 can include identification of the driver 111 for whom the report is generated, a driver identification number 112, a time period 113 covered by the report, and a summary of the commands 114 sent and received during the time period.

The audio centric social network can also be connected with other social networks, such as Facebook. Drivers that engage in lengthy or interesting conversations may wish to exchange contact information so they can communicate again at a later date. Additionally, drivers within a user's social bubble may be friends with one or more of the user's friends. A suggestion for the user and driver to connect on Facebook or another social network can be made automatically, such as based on friends of friends or another driver with similar characteristics.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for facilitating communication between drivers, comprising:
   a database to store location data for a plurality of drivers;
   a mobile device associated with one of the drivers to receive a command from that driver;
   a server comprising a central processing unit, memory, an input port to receive the location data from the database and the command from the mobile device, and an output port, wherein the central processing unit is configured to:
   monitor the drivers in real time;
   determine in real time a location of the driver associated with the mobile device from the plurality of other drivers based on the location data;
   determine for the driver, a social bubble comprising a network of at least a portion of other drivers as participants from the plurality that are proximate to the driver based on the identified location by applying a size threshold comprising a total number of drivers to the social bubble;

change the participants in the social bubble in real time as the location of the driver changes based on the driver location and size threshold, comprising:
    automatically add to the social bubble at least one new driver that is proximate to the driver as the driver's location changes; and
    automatically remove one or more of the participants in the social bubble from the social bubble when the location of the one or more participants is no longer proximate to the driver's location; and
    transmit the command from the driver to one or more of the participants in the social bubble at the time the command is received from the driver, wherein any response received in reply to the command is processed.

2. A system according to claim 1, wherein the central processing unit identifies the social bubble by determining traffic density at the location, determining a speed of a vehicle of the driver, determining a proximate distance based on the vehicle density and speed, determining that the distance of each of the other drivers from the driver satisfies the proximate distance, and grouping the other drivers as members of the social bubble.

3. A system according to claim 2, wherein the central processing unit applies factors to reduce a number of the other drivers within the social bubble.

4. A system according to claim 1, wherein the central processing unit receives identification information for the driver from the user, identifies the driver based on the identification information, and transmits the command to the identified driver.

5. A system according to claim 1, wherein the central processing unit determines an appropriateness of the command for delivery by determining a sentiment of the command, by identifying the sentiment of the message as positive, by validating the message, and by assigning a level of appropriateness of the command for delivery.

6. A system according to claim 5, wherein the central processing unit rewrites the command when the command is determined to be not appropriate for delivery.

7. A system according to claim 1, wherein the central processing unit validates the command prior to delivery by reviewing previous commands from the user, determining a reputation of the user based on the previous commands, and validating the command when the reputation is positive.

8. A system according to claim 1, wherein the central processing unit validates the command prior to delivery by determining content of the command, determining whether a recipient of the command has previously received commands similar to the content of the command, and validating the command when a predefined number of similar commands have been received for the recipient.

9. A system according to claim 1, wherein the central processing unit determines a cognitive load of an intended recipient of the command, applies a threshold to the cognitive load, and delivers the command when the cognitive load satisfies the threshold.

10. A system according to claim 1, wherein the central processing unit provides to the user, a report comprising a tally of commands received from other drivers.

11. A system according to claim 1, wherein the central processing unit updates the network of other drivers in the social bubble as the user drives.

12. A computer-implemented method for facilitating communication between drivers, comprising:
    maintaining location data for a plurality of drivers in a database;
    identifying a command from one of the drivers via a mobile device associated with that driver;
    monitoring the drivers via a server comprising a central processing unit, memory, an input port to receive the location data from the database and the command from the mobile device, and an output port;
    determining in real time a location of the driver associated with the mobile device from the plurality of other drivers based on the location data;
    determining for the driver, a social bubble comprising a network of at least a portion of other drivers as participants from the plurality that are proximate to the driver based on the identified location by applying a size threshold comprising a total number of drivers to the social bubble;
    changing the participants in the social bubble as the location of the driver changes based on the driver location and size threshold, comprising:
        automatically adding to the social bubble at least one new driver that is proximate to the driver as the driver's location changes; and
        automatically removing one or more of the participants in the social bubble from the social bubble when the location of the one or more participants is no longer proximate to the driver's location; and
    transmitting the command from the driver to one or more of the participants in the social bubble at the time the command is received from the driver, wherein any response received in reply to the command is processed.

13. A method according to claim 12, further comprising: determining the social bubble, comprising:
    determining traffic density at the location;
    determining a speed of a vehicle of the driver;
    determining a proximate distance based on the vehicle density and speed;
    determining that the distance of each of the other drivers from the driver satisfies the proximate distance; and
    grouping the other drivers as members of the social bubble.

14. A method according to claim 13, further comprising: applying factors to reduce a number of the other drivers within the social bubble.

15. A method according to claim 12, further comprising: receiving identification information for the driver from the user;
identifying the driver based on the identification information;
transmitting the command to the identified driver.

16. A method according to claim 12, further comprising: determining an appropriateness of the command for delivery, comprising:
    determining a sentiment of the command;
    identifying the sentiment of the message as positive;
    validating the message; and
    assigning a level of appropriateness of the command for delivery.

17. A method according to claim 16, further comprising: rewriting the command when the command is determined to be not appropriate for delivery.

18. A method according to claim 12, further comprising: validating the command prior to delivery, comprising:
    reviewing previous commands from the user;
    determining a reputation of the user based on the previous commands; and validating the command when the reputation is positive.

19. A method according to claim 12, further comprising:
validating the command prior to delivery, comprising:
- determining content of the command;
- determining whether a recipient of the command has previously received commands similar to the content of the command;
- validating the command when a predefined number of similar commands have been received for the recipient.

20. A method according to claim 12, further comprising:
determining a cognitive load of an intended recipient of the command;
applying a threshold to the cognitive load; and
delivering the command when the cognitive load satisfies the threshold.

21. A method according to claim 12, further comprising:
providing to the user, a report comprising a tally of commands received from other drivers.

22. A method according to claim 12, further comprising:
updating the network of other drivers in the social bubble as the user drives.

* * * * *